(12) United States Patent
Zeevi et al.

(10) Patent No.: US 7,080,284 B1
(45) Date of Patent: *Jul. 18, 2006

(54) COMPUTER SERVER ARCHITECTURE AND DIAGNOSTIC FRAMEWORK FOR TESTING SAME

(75) Inventors: Josef Zeevi, Austin, TX (US); Richard Lee Sanders, Hutto, TX (US)

(73) Assignee: Newisys, Inc., Austin, TX (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/199,938

(22) Filed: Jul. 19, 2002

(51) Int. Cl.
*G06F 11/00* (2006.01)

(52) U.S. Cl. .......................... 714/31; 714/46
(58) Field of Classification Search .................. 714/31, 714/46
See application file for complete search history.

(56) References Cited

U.S. PATENT DOCUMENTS

| 3,810,577 | A | * | 5/1974 | Drescher et al. ............... 714/25 |
| 4,030,072 | A | * | 6/1977 | Bjornsson .................... 714/31 |
| 4,112,264 | A | * | 9/1978 | Abramson et al. .......... 714/712 |
| 5,005,172 | A | * | 4/1991 | Kawamoto .................... 714/31 |
| 5,319,775 | A | * | 6/1994 | Loges et al. .................... 714/31 |
| 5,664,093 | A | * | 9/1997 | Barnett et al. ................. 714/31 |
| 5,692,123 | A | * | 11/1997 | Logghe ........................ 714/48 |
| 5,815,652 | A | * | 9/1998 | Ote et al. ...................... 714/31 |
| 5,964,891 | A | * | 10/1999 | Caswell et al. ............... 714/31 |
| 6,199,018 | B1 | * | 3/2001 | Quist et al. .................... 702/34 |
| 6,516,427 | B1 | * | 2/2003 | Keyes et al. .................. 714/25 |
| 6,601,183 | B1 | * | 7/2003 | Larson et al. ................... 714/4 |
| 6,654,914 | B1 | * | 11/2003 | Kaffine et al. ................. 714/43 |
| 6,769,022 | B1 | * | 7/2004 | DeKoning et al. .......... 709/223 |
| 2003/0005200 | A1 | * | 1/2003 | Kumar et al. ................ 710/302 |
| 2003/0090878 | A1 | * | 5/2003 | Merkin ........................ 361/724 |

OTHER PUBLICATIONS

AMD, "HyperTransport Tehcnology I/O Link", Jul. 20, 2001, AMD.*
Microsoft Press Computer Dictionary Third Edition, "gate array", Microsoft Press, 1997, p. 215.*

* cited by examiner

*Primary Examiner*—Scott Baderman
*Assistant Examiner*—Gabriel Chu
(74) *Attorney, Agent, or Firm*—Galasso & Associates, LP; Raymond M. Galasso

(57) ABSTRACT

A computer server architecture and diagnostic framework for testing same is described. The diagnostic infrastructure consists of various logical modules present on both service processor-side and platform-side regions of a server. These modules work together to present a modular, extensible yet unitary diagnostic framework. The invention permits dynamic operation of information resources, and extensibility when/if expansion is needed. The server architecture includes an OS independent, custom ASIC and processors configured in a 4-way geometry which permits scalable expansion up to a 16-way configuration geometry within a SMP programming model. The server architecture is capable of integration with third party management frameworks, for example, SNMP and CIM, and is modularly scalable, i.e., offers a "one to many" management capability. The server architecture is capable of both 32-bit and 64-bit computing, and the 64-bit computing ability is 32-bit application backward compatible, offering the advantage of a non-disruptive migration to 64-bit computing.

5 Claims, 10 Drawing Sheets

COMPUTER SERVER ARCHITECTURE AND DIAGNOSTIC FRAMEWORK FOR TESTING SAME

FIELD OF THE DISCLOSURE

The present invention relates generally to computer diagnostics, and more particularly to computer server architectures and computer diagnostics for testing same.

BACKGROUND

Information and the means to exchange information via computing technology have grown to be sophisticated and complex compared to the state of the art a mere 15 years ago. Today, computers have become critical to the efficient function and conduct of business in numerous sectors worldwide, ranging from governments to corporations and small businesses. The increasingly critical role of computing assets has, in turn, been the basis for concern from various sectors as to the reliability and manageability of computing assets. System downtime events resulting from hardware problems result in considerable expense to businesses in the retail and securities industries, among others. Moreover, with networked applications taking on more essential business roles daily, the cost of system downtime will continue to grow.

Another significant cost of system downtime is related to diagnosing and repairing a hardware-related problem with a system. Many computer systems provide only minimal diagnostic functions, and these generally only to the level of whether or not the system is running. Embedded diagnostic codes such as power-on self test (POST) exist within a computer system and can perform limited diagnostic tests automatically when a computer is powered up. The POST series of diagnostic tests performed varies, depending on the BIOS configuration, but typically POST tests the RAM (random access memory), keyboard, and access to every disk drive. If these tests are successful, POST initiates loading of the operating system and the computer boots. Otherwise, the fault area is reported/isolated for analysis. However, POST executes its diagnostic functions only upon power-up. POST is not capable of diagnostic monitoring during normal system operations.

Many diagnostic routines typically require a user to know the components of a system and load appropriate modules in order for diagnostic testing to function for all hardware elements of a system. These diagnostic routines do not contain self-managing or dynamic processes to discover failed hardware and permit identification of the system hardware problem without user intervention. In addition, many diagnostics routines cannot be run across partition boundaries, and many diagnostic routines effectively cannot run across a network and/or the Internet.

Currently there are built-in test modules, but no stand-alone test modules commercially available that are able to run true diagnostics concurrent with normal system operation. This is because the computer's operating system (O/S) generally considers itself to "own" certain system resources, and thus prevents the stand-alone test module's diagnostics routine from involving device drivers and O/S cooperation in many of the diagnostic functional tests.

Therefore, what is needed is an improved methodology for diagnostic testing in computer systems which overcomes these problems, and provides for dynamic processes without user intervention.

SUMMARY OF THE INVENTION

In one embodiment of the present invention, a system includes a plurality of servers coupled together via expandable interfaces. The plurality of servers comprises a plurality of platforms associated with particular servers, service processors associated with particular servers and at least one program of instructions including instructions to permit the service processors and the plurality of platforms to form a unitary diagnostic framework. The plurality of platforms is coupled in 4-way configurations via point-to-point communication links and includes access ports. The service processors are coupled to the plurality of platforms via the access ports. A first service processor associated with a particular server is coupled to particular platforms of the plurality of platforms via the access ports. A second service processor associated with a different server communicates with the first service processor within the unitary diagnostic framework.

In another embodiment of the present invention, a system comprises a first platform, a second platform, a first service processor and a second service processor. The first service processor is capable of communicating with the first platform to diagnose elements associated with the first platform. The first service processor diagnoses the elements using a first set of diagnostic modules to be executed by the first platform and a second set of diagnostic modules to be executed by the first service processor. The first service processor is capable of diagnosing elements associated with the second platform using the second service processor.

In another embodiment of the present invention, a system comprises a first platform, a second platform, a first service processor and a second service processor. The first service processor is capable of communicating with the first platform to diagnose elements associated with the first platform. The first service processor diagnoses the elements using a first set of diagnostic modules to be executed by the first platform and a second set of diagnostic modules to be executed by the first service processor. The first set of diagnostic modules and the second set of diagnostic modules form a unitary diagnostic framework. The second service processor is capable of diagnosing elements associated with the first platform using the first service processor.

In another embodiment of the present invention, a diagnostic framework including modules running on a first service processor and a first platform is established. The diagnostic framework includes a first executive module running on the first service processor and a second executive module running on the first platform. A diagnostic command is provided to the first executive module and is routed to the second executive module. The diagnostic command is delivered to a test module running on the first platform. The diagnostic framework further includes a third executive module running on a second service processor and a fourth executive module running on a second platform. A diagnostic command is provides to the first executive module, is routed to the third executive module, is routes to the fourth executive module and is delivered to a test module running on the second platform.

In another embodiment of the present invention, a server comprises a plurality of processors, at least one service processor coupled to the plurality of processors, a scaling device coupled to the plurality of processors and the service processor, a first set of diagnostic modules to be executed by the service processor and a second set of diagnostic modules to be executed by one or more of the plurality of processors. The first and second sets of diagnostic modules form a diagnostic framework across an interface linking the service processor and the plurality of processors. The scaling device enables the server to be scaled with one or more additional servers to form up to a 16-way configuration.

These and other objects, embodiments, advantages and/or distinctions of the present invention will become readily apparent upon further review of the following specification, associated drawings and appended claims.

BRIEF DESCRIPTION OF THE DRAWINGS

Other advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE FIGURES

Figure 1:
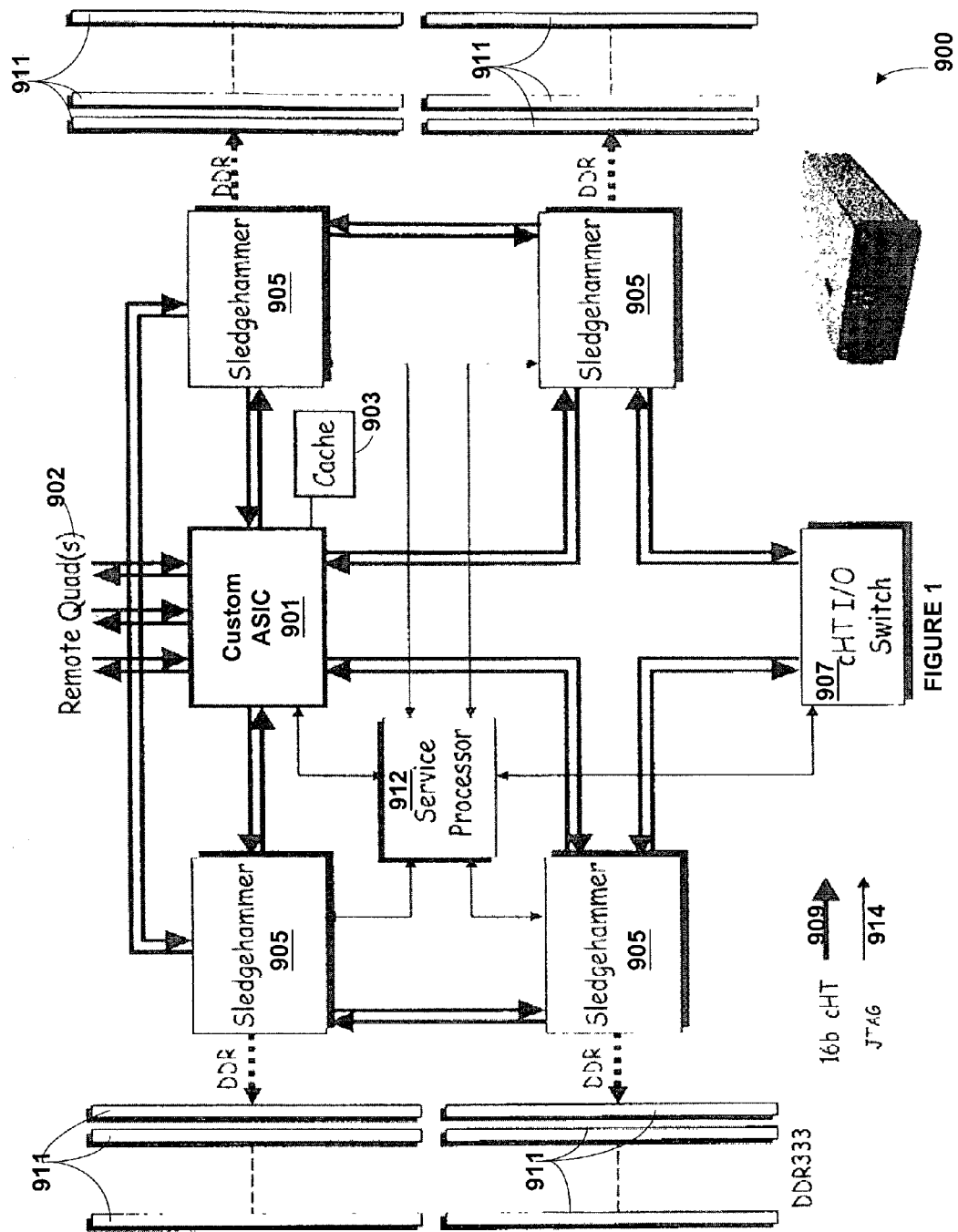
FIG. 1 is a block diagram illustrating a server hardware architecture according to at least one embodiment of the present invention.

FIGS. 1–10 illustrate a diagnostic framework for use in a distributed memory, symmetric multiprocessor (SMP) server hardware architecture environment. The present disclosure discusses a hardware and software architecture methodology for providing a modular, extensible diagnostic infrastructure, as described in detail in the text which follows. The diagnostic infrastructure consists of various logical modules that are present on both service processor-side and platform-side regions of a server. These modules work together to present a modular yet unitary diagnostic framework to the user, even if a plurality of service processors and platforms are not physically present in the same server. The present invention permits dynamic operation of information resources, that is, a variety of diagnostic testing can be conducted concurrent with normal system operations. This is an advantage over current diagnostic programs which typically do not permit other system operations to be conducted during a diagnostics test. In addition, the system is capable of dynamic identification/discovery/registration of new hardware or changes to existing hardware without intervention from a user.

The diagnostic architecture methodology taught herein offers extensibility when system expansion is needed to meet the growth needs of a user. This offers an advantage of cost-effectiveness to a company when computational needs grow because the system as disclosed herein may be added onto (expanded) easily without performance degradation. In an embodiment, an OS independent, custom ASIC (application specific integrated circuit) and other processors are configured in a 4-way geometry which permits scalable expansion up to a 16-way geometry within the SMP programming model.

The method, systems and server architecture disclosed herein are capable of integration with third party management frameworks, for example, SNMP (simple network management protocol) and CIM (common information model), and are modularly scalable, i.e., offer a "one to many" management capability. In addition to 32-bit computational ability, the server architecture disclosed herein is capable of 64-bit computational ability as well. This 64-bit computing ability is backward compatible with 32-bit applications, yet offers the advantage of maximum 64-bit computational density. The server architecture as disclosed herein has the ability to run 32-bit and 64-bit applications in the same system, thus offering the advantage of a non-disruptive migration to 64-bit computing. A 64-bit computing capability permits larger addressable memory and computational power, which results in improved performance for OLAP, OLTP, and DB workloads.

The following definitions are not intended to be limiting, but are provided to aid the reader in properly interpreting the detailed description of the present invention. It will be appreciated that the terms defined herein may be eventually interpreted by a judge or jury, and that the exact meaning of the defined terms will evolve over time. The word "module" as used herein refers to any piece of code that provides some diagnostic functionality. Some examples of modules as used herein include device drivers, command interfaces, executives, and other applications. The phrase "device drivers," as used herein and sometimes referred to as service modules, refers to images that provide service to other modules in memory. A driver can "expose a public interface," that is, make available languages and/or codes that applications use to communicate with each other and with hardware. Examples of exposed interfaces include an ASPI (application specific program interface), a private interface, e.g., a vendor's flash utility, or a test module protocol for the diagnostic platform to utilize. The word "platform" as used herein generally refers to functionality provided by the underlying hardware. Such functionality may be provided using single integrated circuits, for example, various information processing units such as central processing units used in various information handling systems. Alternatively, a platform may refer to a collection of integrated circuits on a printed circuit board, a stand-alone information handling system, or other similar devices providing the necessary functionality. The term platform also describes the type of hardware standard around which a computer system is developed. In its broad sense, the term platform encompasses service processors that provide diagnostic functionality, as well as processors that provide server functionality. The word "server" as used herein generally refers to a complete, functional product embodied by the present disclosure, typically a service processor (SP) and one or more processors. In an embodiment, the one or more processors are AMD K8 processors, or other processors with performance characteristics meeting or exceeding that of AMD K8 processors. In some cases, "server" may refer to a group of servers functioning in cooperation with each other.

The servers as embodied by the present invention can deliver Enterprise-level system management and remote access server (RAS) features to meet the load requirements imposed by the growing demands on servers in today's information-hungry markets. The modular scalability of the system means that processing power can be adapted to workloads ranging from a basic SP/platform for the entry-level buyer, up to high-end SMP servers for Fortune 500 data center environments and/or enterprise resource planning (ERP) systems. A block diagram illustrating the basic server hardware architecture according to an embodiment of the present disclosure is illustrated in FIG. 1. Recall that "server" as used herein generally refers to a complete, functional product embodied by the present disclosure, typically a service processor (SP) and one or more other processors, as seen in FIG. 1, and designated as server 900.

The illustrated embodiment of server 900 in FIG. 1 contains an OS independent, custom ASIC (application specific integrated circuit) 901 at the heart of the diagnostic system hardware. Custom ASIC 901 allows scalable expansion up to 16-way within the SMP (symmetric multiprocessor) programming model, as indicated by the coherent HyperTransport (cHT) signal lines 909 to/from remote quads 902. The custom ASIC 901 has an attached cache 903 for performance. The hardware as illustrated also contains four AMD K8 "Sledgehammer" processors 905, with a coherent HyperTransport (cHT) input/output (I/O) switch 907, as HyperTransport data interconnection technology is utilized within one embodiment of the system. Coherent HyperTransport is a proprietary implementation of HyperTransport technology developed by Advanced Micro Devices (AMD), with added coherency features to properly enable connection between processors. Thus 16-bit cHT signal lines 909 permit chip-to-chip data exchange between Sledgehammers 905 and custom ASIC 901, as well as to remote quads 902. Banks of DDR (double data rate) memory 911 provide distributed shared-memory for the SMP arrangement. DDR 911 can be dual channel DDR 333 or another DDR arrangement. Communication between the service processor 912 and the other components (i.e., 901, 907, 905) are handled by the common protocol of the Standard Test Access Port and Boundary-Scan Architecture (JTAG) 914.

Figure 2:
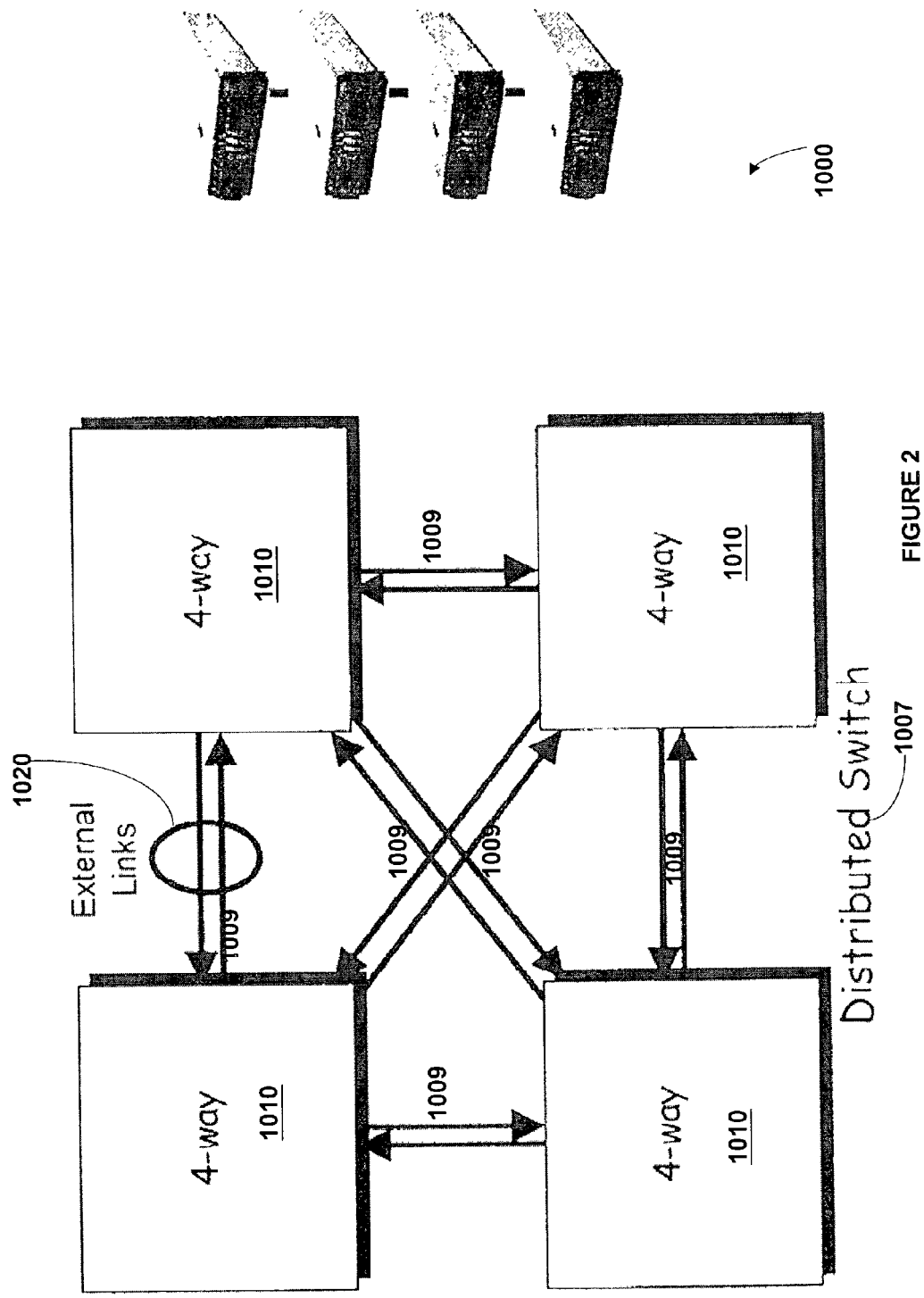
FIG. 2 is a block diagram illustrating an expansion of a single server into a cluster of four, 4-way servers according to at least one embodiment of the present invention.

FIG. 2 is a block diagram illustrating an expansion of a single server into a cluster 1000 of four, 4-way servers according to an embodiment of the present invention. Each 4-way server 1010 would contain the hardware as described in FIG. 1. Again, the HyperTransport interconnection technology is used to provide point-to-point (e.g., peer-to-peer) transactions 1009 between 4-way servers 1010, effectively scaling the system up to 16-way. HyperTransport provides for standard bus widths of 2, 4, 8, 16, and 32 bits to match I/O characteristics to specific applications, including asymmetric widths to support dissimilar upstream and downstream bandwidth, if needed. A 16-bit HyperTransport I/O bus as discussed herein can deliver about 25.6 Gbit/sec bandwidth capable of supporting two OC-192 SONET (Synchronous Optical NETwork) bit streams, or two 10 Gbit/sec Ethernet links. The choice of external links 1020 (e.g., Ethernet or SONET) to provide access to server cluster 1000 is generally dependent upon OEM requirements. Other suitable interconnect technology may be employed consistent with the teachings set forth herein.

In an embodiment of the present invention, hardware architecture to present a unified diagnostic framework to a user comprises a first platform and a first service processor capable of communicating with the first platform to diagnose hardware elements associated with the first platform. The first service processor diagnoses the hardware elements utilizing a first set of diagnostic modules executed on the first platform, as well as a second set of diagnostic modules executed on the first service processor. The first set of diagnostic modules is loaded onto the platform under control of the service processor. The first set of diagnostic modules to be executed on the platform includes a module capable of providing (to the service processor) information regarding hardware elements associated with the platform. Particular modules to be loaded onto the platform are determined in part based upon hardware elements associated with the platform.

In addition, a second platform and a second service processor can be included in the system, and the first service processor utilized to diagnose hardware elements associated with the second platform, via the second service processor. In the "one to many" concept as taught herein, the system can include a plurality of platforms connected via a point-to-point link (cHT). Communications between service processors and platforms are via an access protocol, which are included in all service processors and all platforms. In an embodiment, the service processor is capable of communicating with particular platforms within the plurality of platforms to diagnose hardware elements associated with the particular platforms by utilizing a third set of diagnostic modules executed on the particular platforms, and a second set of diagnostic modules executed on the service processor. The second set of diagnostic modules to be executed on the service processor includes a module capable of discovering hardware elements associated with the platform.

In an embodiment, at least two of the plurality of platforms discussed above are part of a particular server. For example, one of the plurality of platforms is part of a first server, and another platform of the plurality of platforms is part of a second server, with the second server being coupled to the first server.

The methodology of the present invention encompasses establishing a diagnostic framework with modules running on a first service processor and a first platform. The first service processor and the first platform communicate via a multiple access, shared memory area with interrupt driven notification. The diagnostic framework includes a first executive module running on the first service processor, and a second executive module running on the first platform. The first executive module is loaded onto the first platform under control of the first service processor. A diagnostic command is provided to the first executive module, routed to the second executive module, and delivered to a test module running on the first platform. The diagnostic command is executed using the test module, and the diagnostic results from the test module are delivered to the first executive module via the second executive module.

The methodology of the present invention is adaptable to a "one to many" paradigm as well, in that the diagnostic framework can include a third executive module running on a second service processor and a fourth executive module running on a second platform. In this case, a diagnostic command is provided to the first executive module, the diagnostic command is routed to the third executive module and to the fourth executive module, and delivered to a test module running on the second platform.

In an embodiment, the methodology can be applied to a third executive module running on a second platform. In this instance, a diagnostic command is provided to the first executive module, routed to the third executive module, and delivered to a test module running on the second platform. The first and second platforms are connected via a point-to-point link, and are part of a particular server. The first platform is part of a first server, while the second platform is part of a second server, and the second server is coupled to the first server. This "messaging" and the interfaces that exist between service processors (SPs) and platforms, or between SPs is discussed in detail with reference to the illustrations of FIGS. 3, 4, and 5.

Figure 3:
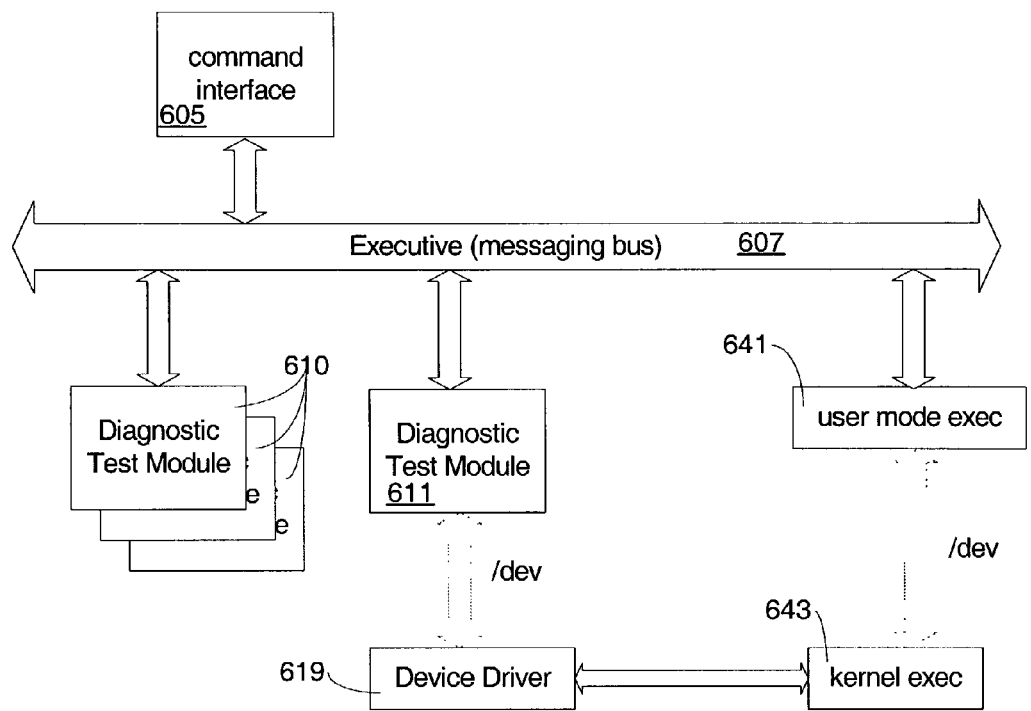
FIG. 3 is a block diagram illustrating a general messaging view achieved by communication through a diagnostic executive module (DEM) according to at least one embodiment of the present invention.

FIG. 3 is a block diagram illustrating the general messaging view achieved by communication through the diagnostic executive module (DEM) according to an embodiment of the present invention. The command interface 605 builds a list of available tests and devices, and allows the user to select (e.g., via Perl commands) which devices to test and which tests to run. A user can elect to run a single diagnostic test, a series of tests, or all of the available diagnostic tests within the system as embodied. (Assuming, of course, that the user has been given authority to do so.) In addition, the user can elect to test a single device or module, or any combination of desired modules, up to and including all modules and devices in the system. The DEM, Executive (messaging bus) 607, receives the test request from the command interface 605 and passes the test request to the appropriate receivers, e.g., other diagnostic components such as diagnostic test modules 610 and 611, and device drivers 619. The other diagnostic components report their status to the DEM 607, which returns the information the command interface 605. For example, if a message from command interface 605 is received by the DEM 607, this message is then passed to the appropriate test module, such as DTM 610 or DTM 611. The results obtained from the test modules (e.g., 610 or 611, or 619) are then communicated to the DEM 607, and then are communicated from the DEM 607 back to the command interface 605, where the message results are sent to the user. The DEM 607 also provides messaging functions with user mode executables 641, as well as kernel executables 643. The DEM messaging bus 607 which handles the communications transactions is transparent to the modules. The bus 607 is implemented via library functions that do most of the work. The general messaging view of FIG. 3 shows a unitary diagnostic system, but does not show how a service processor (SP) and platform work together, which is presented in FIG. 4.

Figure 4:
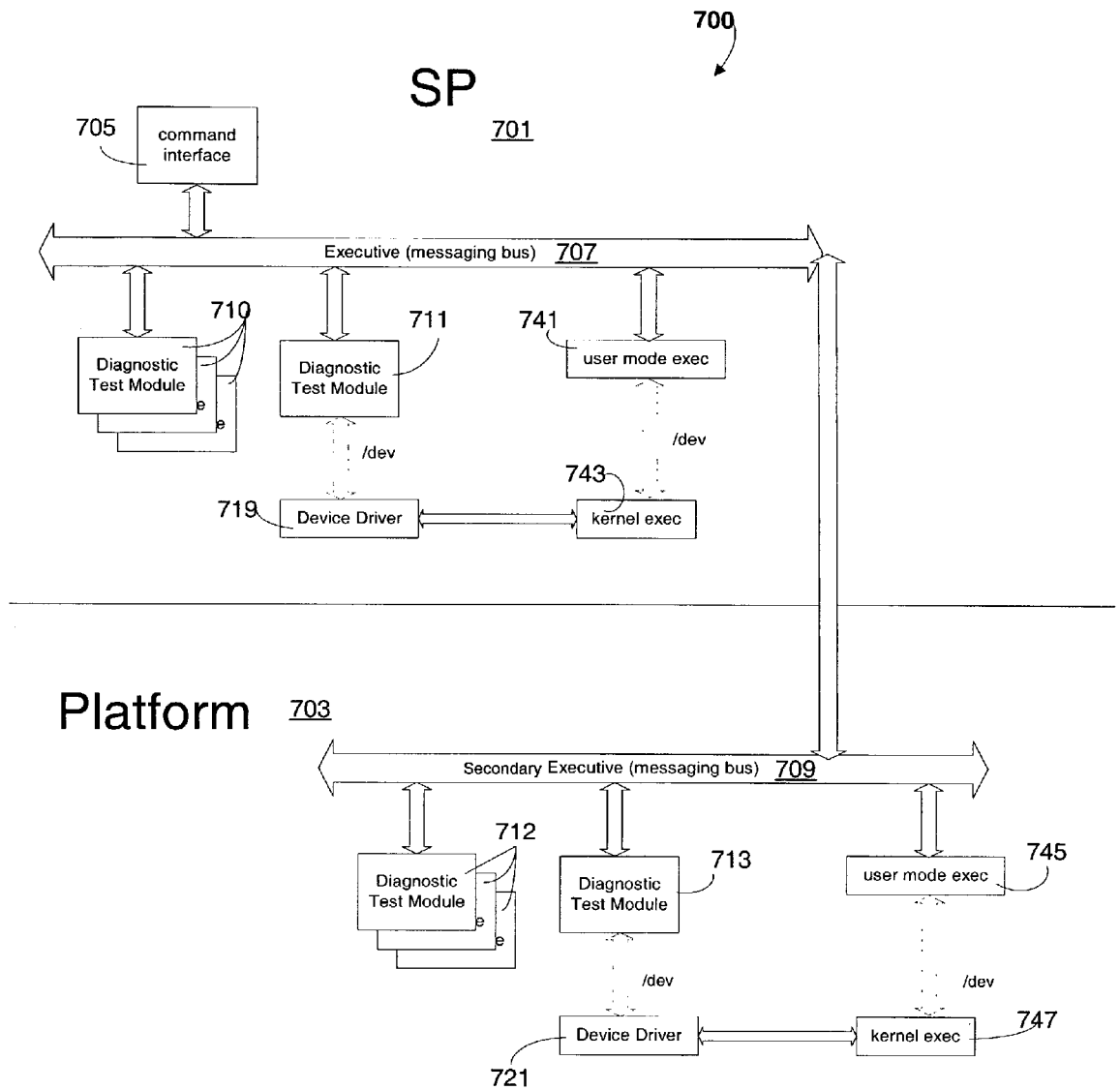
FIG. 4 is a block diagram illustrating a method for enabling a service processor (SP) and platform to form a diagnostic framework according to at least one embodiment of the present invention.

FIG. 4 is a block diagram illustrating a method for providing for the SP and platform to work together to create a diagnostic framework 700 according to an embodiment of the present invention. Diagnostic framework 700 includes at least one service processor (SP) side 701, and at least one platform side 703. A cooperative, efficient exchange between SP side 701 and platform side 703 is accomplished by way of communication mechanisms, discussed in the following paragraphs, between then primary executive 707 and a secondary executive 709. The diagnostic executive secondary protocol (DESP) provides, through a transport layer between a primary executive 707 and a secondary executive 709, a method to communicate to executives that reside on processors other than the processor of the SP side 701. To accomplish this, the DESP echoes all the protocols across whatever boundary the DESP must cross between executives, e.g., SP executive 707 ↔ executive 709. Although not shown in FIG. 4, an embodiment of the present invention provides for utilizing DESPs to communicate between two (or more) SP boundaries such as, for example, SP executive 707 to another SP executive.

Each executive generates unique tokens. However, since there are multiple executives connected by DESPs to logically form one executive, it is important that the "master" executive, e.g., SP executive 707 is able to uniquely identify all objects in diagnostic framework 700, e.g., diagnostic test modules 710, 711, 712 and 713, device drivers 721 and 719, kernel executables 743 and 747, user mode executables 741 and 745, and the like. This is the task of the DESP, which provides a "proxy" mechanism between the "master" executive 707 and any secondary or "slave" executives such as secondary executive 709. This communication mechanism, provided by the diagnostic executive module (DEM), serves as the interface between diagnostic components, enables messaging, and provides support services, within diagnostic framework 700. The DEM can be considered as the core of the diagnostic framework, and is presented in detail in FIG. 5.

Figure 5:
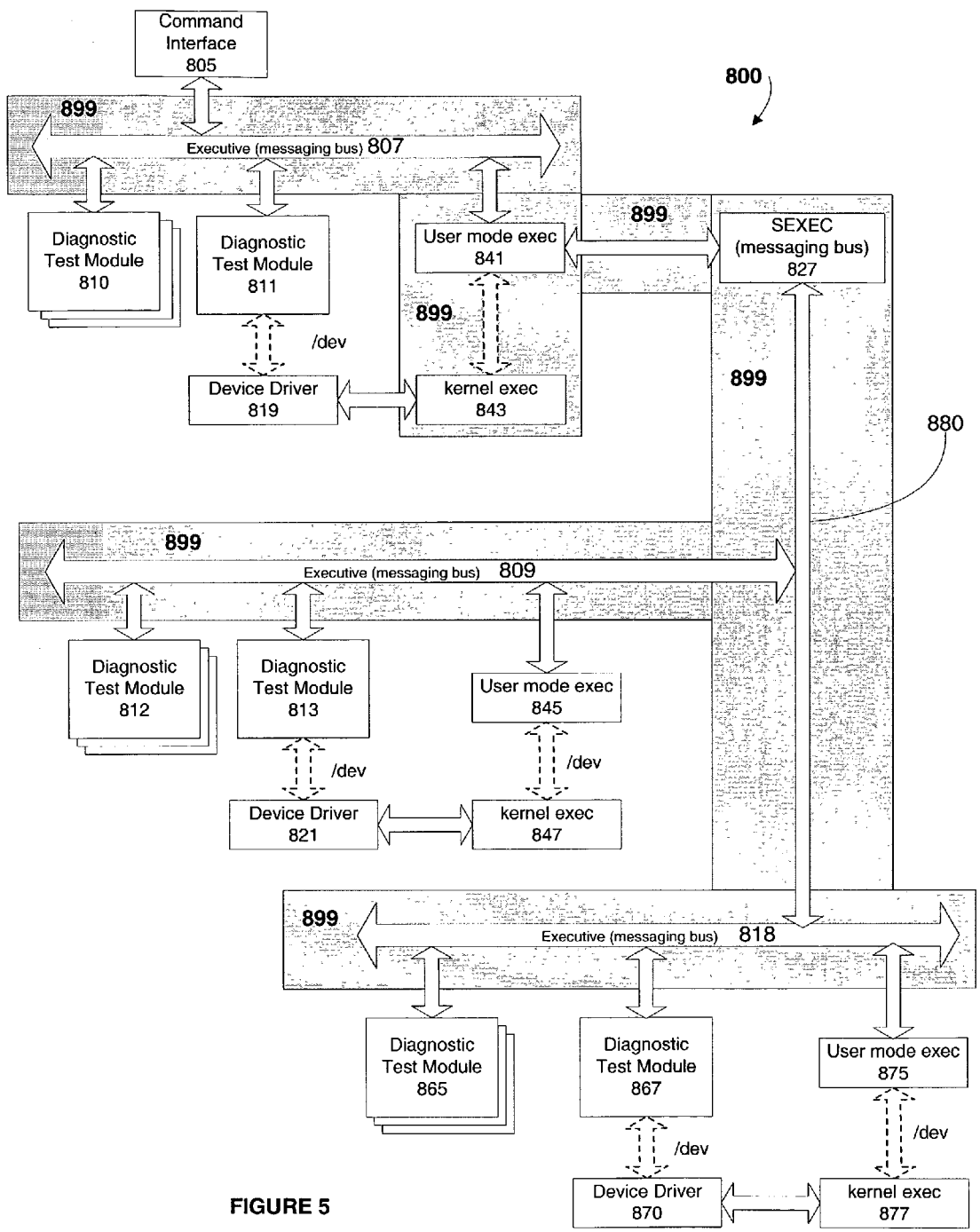
FIG. 5 is a block diagram illustrating an interface between the diagnostic components provided by a diagnostic executive module according to at least one embodiment of the present invention.

FIG. 5 illustrates the interface between the diagnostic components in a diagnostic system provided by the diagnostic executive framework modules according to an embodiment of the present invention. The method comprises running a first set of diagnostic modules on a first service processor, in which the first set of modules includes a first or "master" executive module 807. A second set of diagnostic modules, including a secondary executive module 809, is running on a first platform. The first executive module 807 and the second executive module 809 are communicatively linked by the SEXEC 827 such that the first set of diagnostic modules and the second set of diagnostic modules form a unitary diagnostic framework. Further, a third set of diagnostic modules, including a third executive module 818, is running on a second platform. The second platform is communicatively linked by SEXEC 827 to the service processor such that the first set of modules, the second set of modules, and the third set of modules form a unitary diagnostic framework such as diagnostic system 800. The first platform and second platform (and any other additional platforms) are connected via a point-to-point link 880.

The method as taught herein supports extensibility across multiple service processors and platforms by providing messaging over sockets along with appropriate identification services to allow the diagnostics to appear as a unitary diagnostic framework (machine), such as diagnostic system 800, when, in actuality, a plurality of service processors and/or a plurality of platforms are under control of the diagnostic framework formed by the diagnostic executive modules. This diagnostic framework component is outlined by the grey areas 899 of FIG. 3, and includes the "master" or service platform executive (messaging bus) 807, user mode executable 841, kernel executable 843, secondary executive (messaging bus) 809, and a third executive (messaging bus) 818. Secondary executive (messaging bus) 809 communicates with the modules on its platform, e.g., diagnostic test modules 812 and 813, device driver 821, user mode executable 845, and kernel executable 847. These communications are passed from the secondary executive 809 to SEXEC 827, to the first executive 807, and eventually to the command interface 805 for consumption by the user. Third executive 818 communicates with the modules on its platform, such as diagnostic test modules 865 and 867, device driver 870, user mode executable 875, and kernel executable 877. These communications are passed from the third executive 818 to SEXEC 827, to the first executive 807, and eventually to the command interface 805 for consumption by the user.

In an embodiment, it is possible to run a plurality of sets of modules on a plurality of platforms, in which each of the plurality of sets of modules includes an executive module. These pluralities of platforms would be communicatively linked to a "master" or first service processor such that the first set of modules (associated with the service processor) and the plurality of sets of modules form a unitary diagnostic framework. Further, a third set of modules, including a third executive module, runs on a second service processor. The second service processor is communicatively linked to the first service processor such that the first set of modules, the second set of modules, and the third set of modules form a unitary diagnostic framework. This extensibility feature enables a plurality of sets of modules, each with their respective executive modules and running on a plurality of service processors to be communicatively linked to the first (master) processor such that the first set of modules and the plurality of sets of modules form a unitary diagnostic framework.

Consequently, the present invention provides for a method and system that enable a user to develop beyond the single service processor—single platform architecture to a multiple service processor—multiple platform architecture, as the growth needs of the user dictate. For example, a company may initially install a single service processor with multiple platforms, and the company's transactional needs may grow to the point where multiple service processors are required. There is no need for the company to discard their original service processor with multiple platform architecture, but rather it may serve as the foundation upon which to "build" the increased computational requirements, i.e., addition of other service processors and/or platforms. Thus the present method, in addition to extensibility, offers the user the advantage of cost-effectiveness because the system can be readily expanded, rather than having to start from "scratch."

In the various embodiments, the diagnostic executive module (DEM) supports messaging services, protocol registration and notification services, ID (token) services, and primary executive-to-other executive communications. The DEM provides a centralized place for modules to register, and ensures that all modules participating in diagnostics system such as system 800 can be tracked and, as appropriate, manipulated. The DEM also supports loading modules for other modules, simplifying the other modules' codes and providing a uniform interface for this functionality. While the diagnostic executive module provides registration and notification services and a way to provide unique tokens, the remainder of the executive services is supported by the development of libraries that are linked and used by the other modules, in particular via the DEM support of the DEIP (refer to, for example, FIG. 10).

The diagnostic executive module, through the protocol mechanisms discussed earlier, determines, at a first service processor, the configuration and availability of the various hardware elements associated with a first platform. The DEM discovers the various hardware elements automatically upon initiation of diagnostic system power-up, or the discoveries (e.g., tests) can be initiated at the request of a user or system management after system initial power-up. Because the DEM is a consumer of the DRIP (diagnostic registration interface protocol) contained within the various diagnostic modules, the DEM can expand the unitary diagnostic framework to include diagnostic modules newly associated with available hardware elements, or the DEM can remove modules associated with hardware elements discovered to be unavailable in the unitary diagnostic framework. The diagnostic executive module component enables the various platforms and/or service processors to be presented as a unified machine, however, the DEM is capable of determining the partition-state of the unitary diagnostic framework.

The DEM maintains a collection of modules that are waiting for notification of a particular protocol (or service) to become available, and notifies the waiting modules when and by whom the protocol is offered. The DEM also notifies modules when the services the modules are using are no longer available, allowing the modules to take appropriate action, e.g., deleting items from a device list. The DEM maintains a list of registered modules and some auxiliary information about the registered modules in order to facilitate inter-module communication. The DEM creates and maintains a list of unique 64 bit tokens that are used by the diagnostic programs to identify modules, devices, tests, parameters, and other "objects" used by the diagnostics.

Tokens are exclusively given out by the executives, and tokens are valid until the DEM is restarted. In an embodiment of the method utilizing a logical bridge between operating environments, e.g., between SP and platform, or SP and secondary SP, a message, which includes a secondary token generated by a secondary executive module, is provided for delivery to a service processor (SP). The secondary executive is running outside of the SP side. A primary token is requested by the secondary executive. The primary token is requested from and generated by the SP-side executive. The primary token is substituted for the secondary token to generate a substitute message, and the substitute message is provided to the service processor. At the time when a message is sent from the SP side to a platform side, or to a secondary SP, the message plus token, generated by the primary (SP-side) executive is received from the SP side by the secondary (platform or secondary SP) executive. The secondary executive substitutes a secondary token for the primary token to generate a substitute message, and then provides the substitute message to a desired module on the platform (or secondary SP) side. Hence we see that the secondary executives have the responsibility of handling translation of tokens between executive contexts. For example, when a token is passed between executive contexts by a secondary executive, the secondary executive shall request a unique token in the new context from the executive there. The secondary executive shall modify the packet (message) to reflect this new <source> token, and will pass the message along as normal. When the return response arrives, the secondary executive will replace the <target> token with the original token from the originating executive context and will then pass along the packet (message). These token translations are cached by the secondary executive and used indefinitely.

In embodiments of the present invention, the format of the unique 64 bit tokens consists of 16 bits of routing information, 32 bits of unique ID information, and 16 bits that are reserved for target use, i.e., use by the object the token was assigned to. The 32 bit unique ID field within the token is a monotonic counter maintained by the (primary) executive. The routing information is for internal data storage that has significance to the executive as to the correct path to take to the desired endpoint. The reserved field is neither modified nor read by either the executive or the secondary executive, but rather is maintained by the object the token was assigned to.

Figure 6:
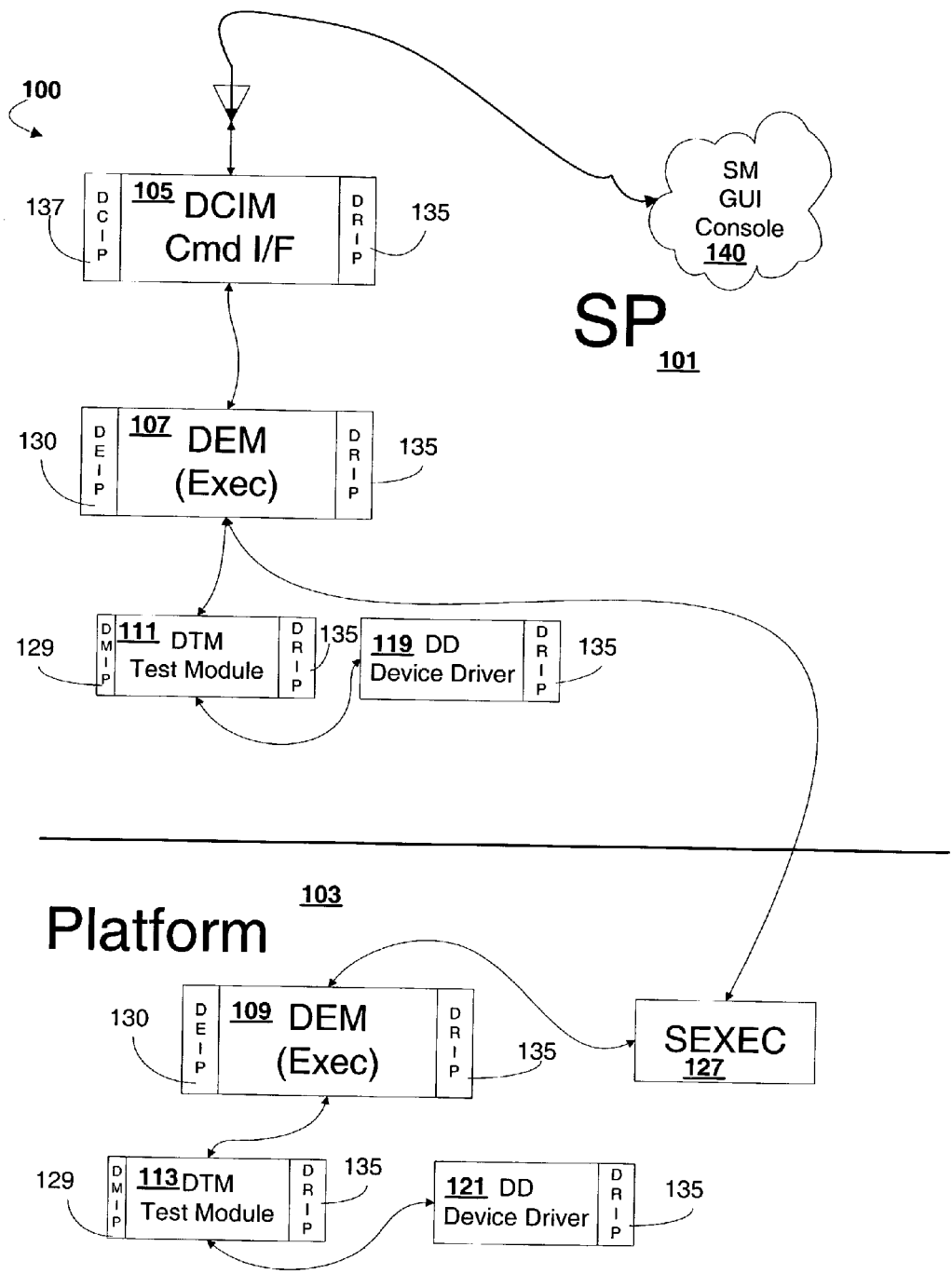
FIG. 6 is a graphical representation illustrating a generalized overview of a diagnostic model according to at least one embodiment of the present invention.

FIG. 6 is a generalized overview of a diagnostic model according to an embodiment of the present invention, designated overall diagnostic framework 100. Overall diagnostic framework 100 is made up of a number of logical modules, duplicates of which exist on both the SP side 101, and the platform side 103. Code exists in the various modules, such as the diagnostic command interface module (DCIM) 105, the SP diagnostic executive module (DEM) 107, the platform DEM 109, the SP diagnostic test module (DTM) 111, the platform DTM 113, the platform secondary executive service module (SEXEC) 127, the SP device driver (DD) module 119, and the platform DD module 121.

Protocols are exposed by modules and consumed by other modules. For example, the diagnostic command interface module (DCIM) 105 communicates with diagnostic test modules 111 and 113 via the diagnostic module interface protocol (DMIP) 129. Other protocols shown in overall diagnostic framework 100 are the executive interface protocol (DEIP) 130, the diagnostic registered interface protocol (DRIP) 135, and the diagnostic command interface protocol (DCIP) 137. DEIP 130 is a set of functions that describes the interface to the diagnostic executives 107 and 109

The diagnostic registered interface protocol (DRIP) 135 is a set of functions that describes the interface to any module that the diagnostics knows about, for example, device drivers 119 and 121, test modules 111 and 113, and so on. The diagnostic command interface protocol (DCIP) 137 is a set of functions that describes the interface to the set of input and output functions for the diagnostics.

Generally, data flows to and from the DCIM 105. The DCIM 105 also serves as the module which supplies output to any user interfaces such as system management GUI console 140. Commands from system management GUI console 140 to conduct tests are passed from the DCIM 105 to the appropriate DTMs 111 or 113. The DTMs 111 or 113 communicate directly with the device under test, and/or use services the DTMs 111 or 113 need from device drivers 119 or 121.

Messages are generated by the DTMs 113 or 111, or other modules as needed, and these messages are passed back to the DCIM 105 for output to the SM GUI console 140. Output to SM GUI console 140 may be a GUI, a text mode script, or any other suitable interface type. The representation of FIG. 6 shows all of these processes running through the DEM 107, because the DEM 107 provides the actual messaging layer for the diagnostics.

It should be noted that although only one diagnostic test module (DTM) and device driver module (DD) are shown in the SP and platform sides in FIGS. 6–10, there can be multiple DTMs and DDs within the framework of the present invention. Accordingly, in order to keep FIGS. 6–10 straightforward, only one DTM and one DD are shown for the SP side, and only one DTM and DD are shown for the platform side. It will also be appreciated that an SP and/or platform may have different numbers of DTMs, or in some cases, no DTM.

Figure 7:
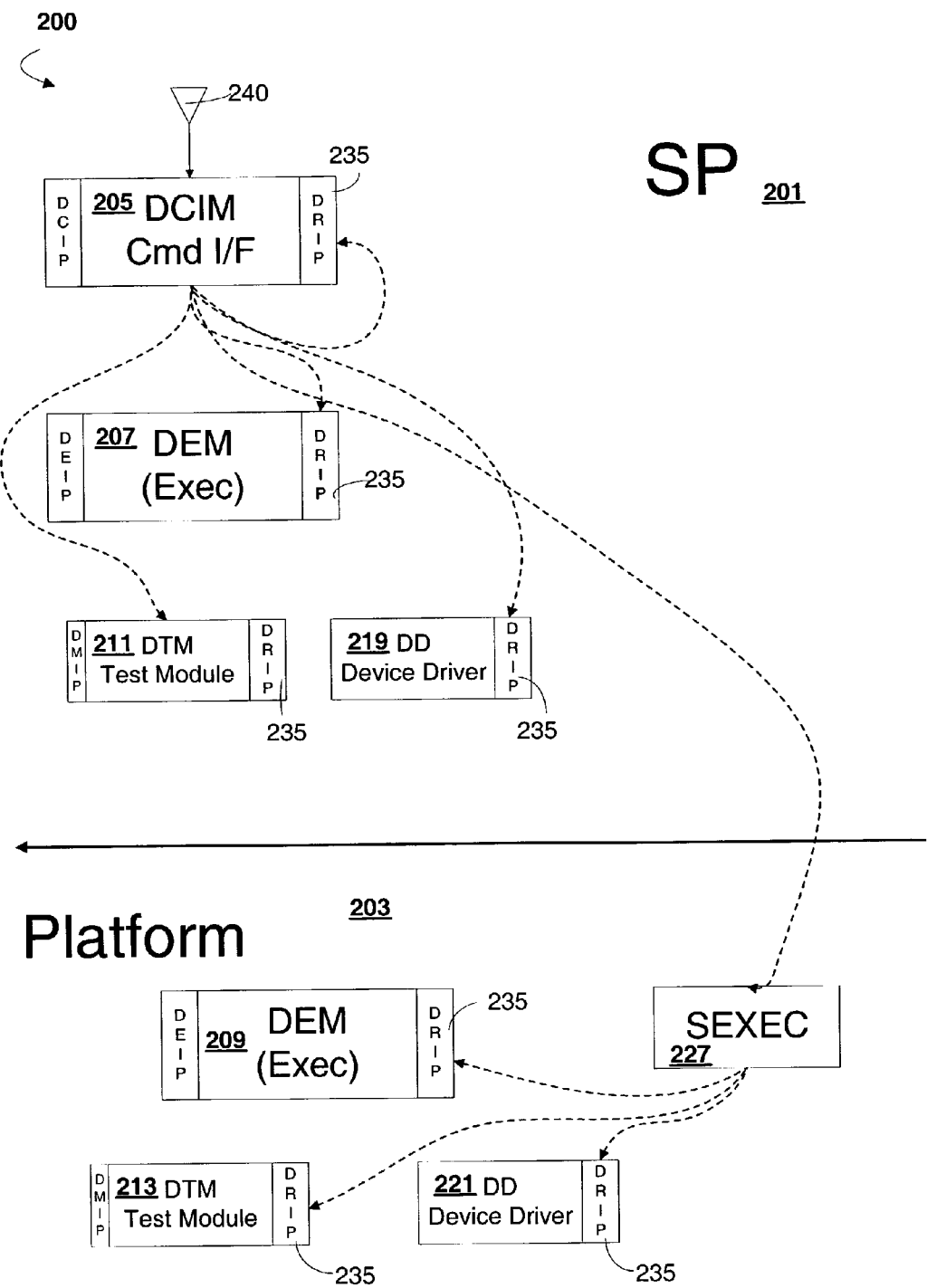
FIG. 7 is a flow diagram illustrating the data flow between modules of a diagnostic framework via a diagnostic registration interface protocol (DRIP) according to at least one embodiment of the present invention.

Particular diagnostic protocols that may be used in implementing various embodiments of the present invention are presented in detail in subsequent paragraphs with reference to FIGS. 7 through 10. Protocols, in general, are messages sent from module to module by a mechanism called "messaging," which will also be covered in detail in subsequent paragraphs. The messaging mechanism is a communication protocol. Many of the protocols disclosed herein are interface protocols. The operation of protocols may be understood as analogous to an Internet web browser. A user sends a request to a web site over TCP/IP, and results are returned. The request and results are data that the TCP/IP protocols carry, without concern for what the data is. The TCP/IP protocol is an example of a messaging protocol. In the diagnostics model as disclosed herein, the messaging layer carries all kinds of requests and responses back and forth between modules without knowing, or caring, about the information. The particular diagnostic interface protocols discussed below specify the kind of messages that can go back and forth. These diagnostic protocols are implemented in a library that is linked to all diagnostic modules. The data flows of the various protocols are covered in detail in FIGS. 7 through 10. FIG. 7 illustrates the data flow between modules via the diagnostic registration interface protocol (DRIP) according to an embodiment of the present invention. FIG. 7 designates the overall diagnostic module as framework 200. As before, framework 200 is made up of logical modules that exist on both the SP side 201 and the platform side 203 of framework 200. In the example diagram of FIG. 7, SP 201 contains various modules such as the diagnostic command interface module (DCIM) 205, the SP diagnostic executive module (DEM) 207, at least one diagnostic test module (DTM) 211, and the SP device driver (DD) module 219. The platform side 203 of the framework also contains a number of modules, such as the platform diagnostic executive module (DEM) 209, at least one platform diagnostic test module (DTM) 213, the platform DD module 221, and the platform secondary executive module (SEXEC) 227.

As seen in FIG. 7, the diagnostic registration interface protocol (DRIP) 235 constitutes a portion of each of the various modules in overall diagnostic framework 200. The DRIP 235 serves to identify each module within the framework of the diagnostic system 200, and each module exposes its respective DRIP interface 235. The dotted lines emanating from the DCIM 205 to the respective modules' DRIP interfaces 235 indicates the communication of identifying features from each of the respective modules, e.g., the modules' name, version, vendor, and help text. The DCIM 205, as the ultimate client of the DRIP-communicated information, searches for and consumes the DRIP 235 information. The DRIP 235 information is passed from platform side 203 to the SP side 201 of framework 200 via the SEXEC 227, where it is passed to the DCIM 205. The DCIM 205 provides output to any user (e.g., system management or GUI console) interface 240.

Figure 8:
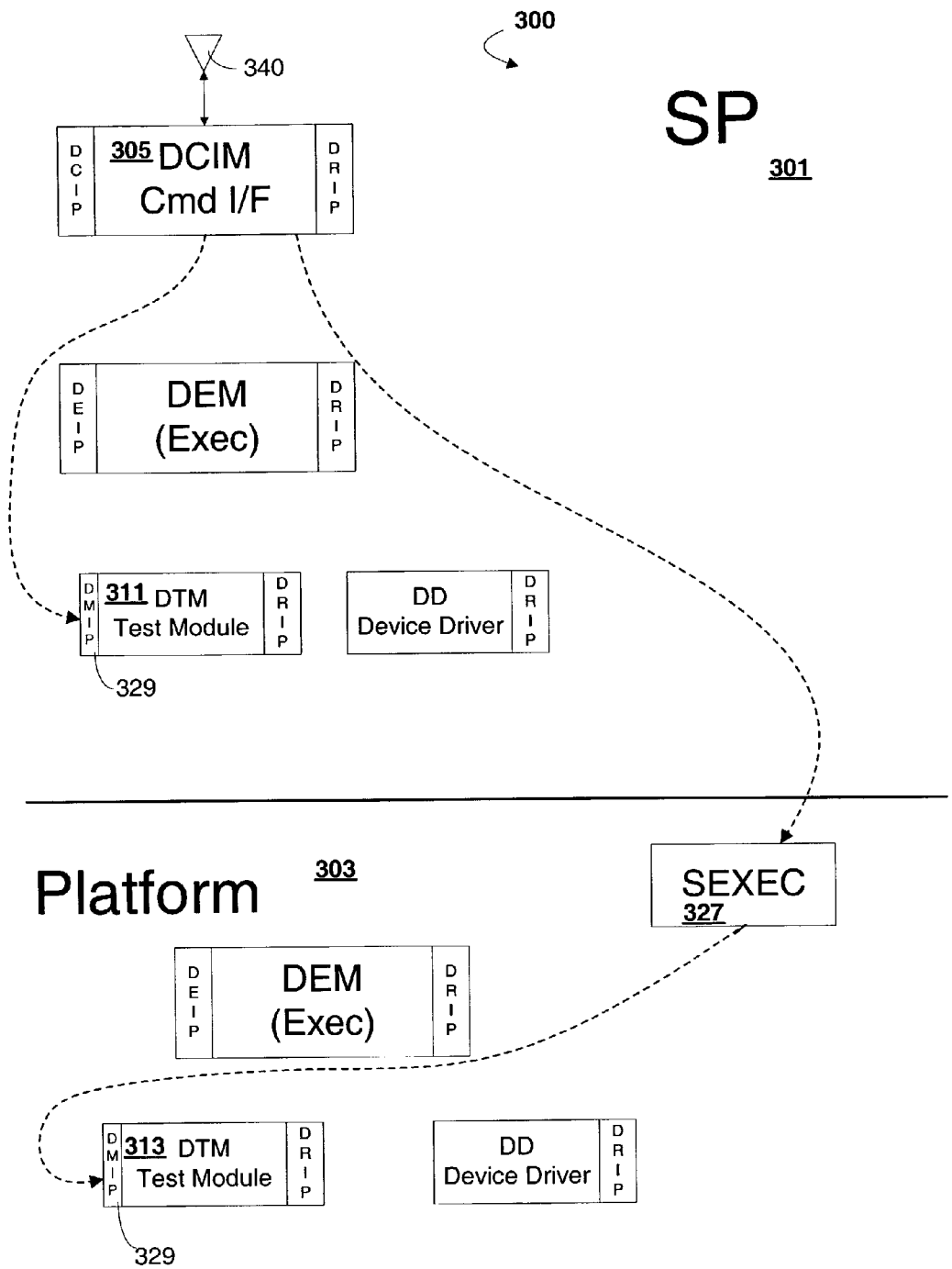
FIG. 8 is a flow diagram illustrating the data flow between modules of a diagnostic framework via a diagnostic module interface protocol (DMIP) according to at least one embodiment of the present invention.

FIG. 8 illustrates the data flow via the diagnostic module interface protocol (DMIP) within framework 300 according to at least one embodiment of the present invention. Again, system framework 300 consists of an SP side 301, and a platform side 303. The DMIP interface 329 is a part of the various diagnostic test modules, such as DTM 311 and DTM 313. The DMIP interface 329 exposes information about the devices, tests, and parameters that a diagnostic test module such as DTM 311 or DTM 313 supports. The DCIM 305 is also the consumer of this information provided by the DMIP 329. The DCIM 305 gathers the data and makes it available to the user interfaces 340.

Figure 9:
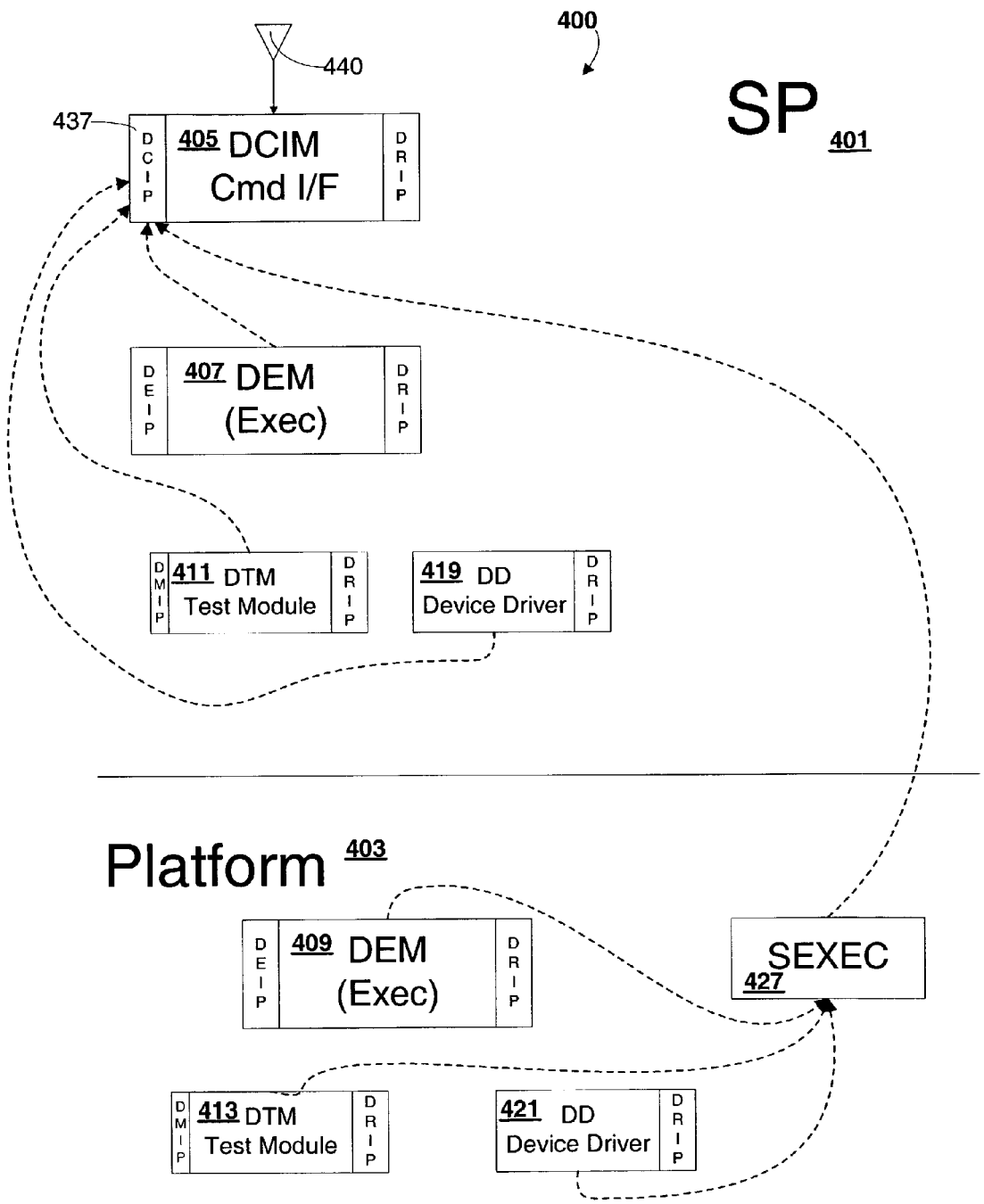
FIG. 9 is a flow diagram illustrating the data flow between modules of a diagnostic framework via a diagnostic command interface protocol (DCIP) according to at least one embodiment of the present invention.

FIG. 9 illustrates the data flow among modules via the diagnostic command interface protocol (DCIP) within framework 400 according to an embodiment of the present disclosure. The DCIP 437 exposes services that any module can use to interface to/from user interface (UI) 440. For the most part, DCIP 437 is used to message to the user interface 440 about the status of a particular test in progress, although during initialization of system diagnostics as embodied herein, many modules will produce messages to indicate their current status. Thus, DCIP 437 is consumed by any module with a need to perform user interface 440 input/output (I/O), as indicated by the dotted lines from the various modules to the DCIP 437. In FIG. 9, for example, these modules are the SP DEM 407, the DTM 411, the DD 419, the platform DEM 409, DTM 413, DD 421, and SEXEC 427. The DCIP 437 supports a socket interface to UI 440, as well as a set of functions that the diagnostic modules can utilize to exchange information with the user interface 440.

In an embodiment, the diagnostic command interface protocol (DCIP) supports a range of functions which includes, but is not limited to, the following: registering and managing a DRIP (diagnostic registration interface protocol); obtaining a session identifier (referred to as a token) to use as a user interface protocol handle; registering the token with the DEM 407 as supporting a DCIP 437; providing informational messages during diagnostic test execution; providing progress messages, e.g., percentage of test completion; providing test status messages during test execution; providing test results, e.g., pass, fail, or other results; displaying a prompt relating to test being executed; getting a response to a request; and providing a mechanism for modules to notify the DCIM 405 when a module's data has changed.

In addition to the range of functions of the DCIP 437 disclosed in the previous paragraphs, the diagnostic command interface protocol (DCIP) 437 provides a varied set of functions supporting user interface (UI) development. These varied set of functions can include, for example, offering support for the tests and drivers to communicate to the user, offering a means of determining system configuration, and offering a method to control tests and parameters. UI 440 is a program that may communicate with the DCIM 405 via script commands, such as Perl commands, to provide input from and output to a user. In an embodiment, UIs are provided to test the diagnostics and can make available templates on how to use the diagnostics. Although only one UI 440 is shown in FIG. 9, there can be several user interfaces, with each UI knowing when a response belongs to it, i.e., data is indicated as "original" or "copy." Examples of the range of UIs which can be utilized according to the present invention include a UI that drives a web interface via a CGI, a UI that drives a serial port, e.g., for manufacturing/engineering/field support, a UI that simply allows monitoring, and other suitable interface types. However, any output messages from the test modules such as DTM 411 or DTM 413 and drivers such as DD 419 and DD 421 are sent to all UI's, to do with as any particular UI deems appropriate. The UI that generated the need for the response will utilize the returned data in some manner that is meaningful to a user (person). The DCIM 405 tracks the UI that requests a test, and only allows the request-originating UI to take an action on a test.

Figure 10:
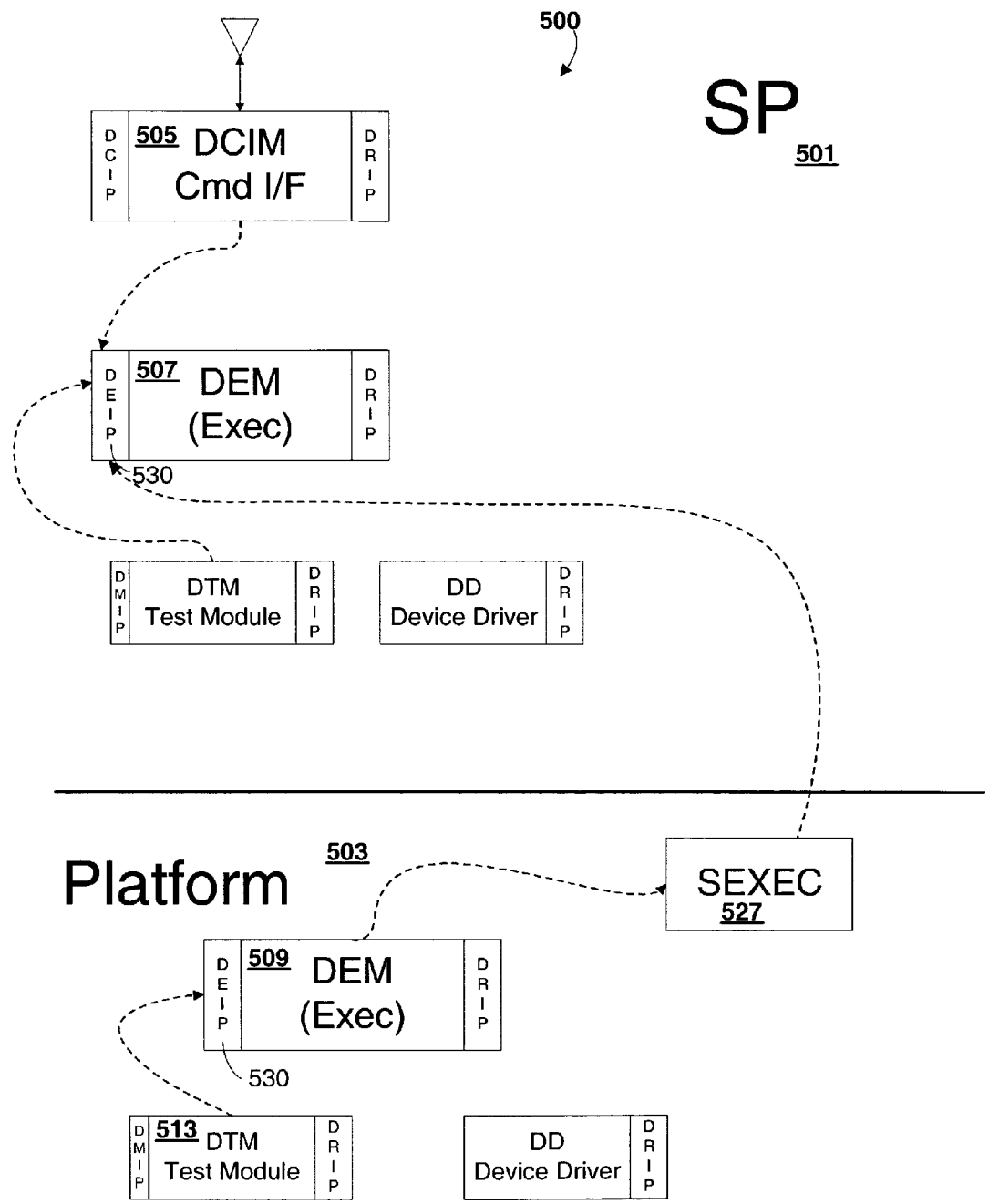
FIG. 10 is a flow diagram illustrating the primary consumers of the functions provided by a diagnostic executive interface protocol (DEIP) according to at least one embodiment of the present invention.

FIG. 10 illustrates the primary consumers of the functions provided by the diagnostic executive interface protocol (DEIP) within framework 500, according to various embodiments of the present invention. There is one DEIP per global memory space, that is, the SP 501 will have DEIP 530, and the platform 503 will have a DEIP 530 for each separate system. The number of DEIPs required for a platform will be dependent, at least in part, upon partitioning conditions on the platform side 503. In the example provided by FIG. 10, there is only one DEIP 530 shown on platform 503.

Within framework 500, the DEIP 530 is utilized by every module. For example, implementing DEIP 530 allows the DEM 507 to support functions such as registration and management of a DRIP, loading a given file as, e.g., a Linux module or daemon, return a unique 64 bit number (token or session identifier), return a list of tokens representing modules supporting a requested protocol, and registering a token for a given protocol. In addition, some modules will also ask to be notified when other modules register their protocols. The implementation of DEIP 530 allows the DEM 507 to notify a module when a protocol upon which the module is waiting becomes available, or, in the case where a module has been waiting for its protocol, when a protocol is going away. Connections from each module that would show modules getting a token and registering a DRIP are not illustrated in FIG. 10. The dotted lines in FIG. 10 indicate the primary consumers of the DEIP 530 functions, e.g., the DEM 507, the DTM 511, the DEM 509, the DTM 513, and the SEXEC 527. Most of the functionality of the present invention as disclosed herein is directly supported by the diagnostic executive module (DEM) 507, which provides the messaging layer for the diagnostics, as described in FIG. 3.

Table 1 provides a summary of the production/consumption of protocols used by the various modules in implementing the unified framework according to embodiments of the present invention. The terms "produces" and "consumes" indicate which modules are producers of protocols, and which modules are consumers of protocols. The protocols are listed in the first row of Table 1, while the modules are listed in the first column of Table 1. For example, when the diagnostic command interface module (DCIM) starts, the DCIM needs to know whom the test modules are. Since all diagnostic test modules (DTMs) provide the diagnostic module interface protocol (DMIP), the DMIP is consumed by the DCIM. The DCIM registers (with the DEM) for notification of all DMIP providers, and when a module initializes that provides a DMIP, the DCIM will be notified (by the DEM) and can query the new module for information.

TABLE 1

Summary of Protocol Production/Consumption

| | Diagnostic Registered Interface Protocol (DRIP) | Diagnostic Module Interface Protocol (DMIP) | Diagnostic Executive Interface Protocol (DEIP) | Diagnostic Command Interface Protocol (DCIP) |
|---|---|---|---|---|
| DCIM (Diagnostic Command Interface Module) | Produces/Consumes | Consumes | Consumes | Produces |
| DEM (Diagnostic Executive | Produces/Consumes | — | Produces | Consumes |

TABLE 1-continued

Summary of Protocol Production/Consumption

| | Diagnostic Registered Interface Protocol (DRIP) | Diagnostic Module Interface Protocol (DMIP) | Diagnostic Executive Interface Protocol (DEIP) | Diagnostic Command Interface Protocol (DCIP) |
|---|---|---|---|---|
| Module) | | | | |
| DTM (Diagnostic Test Module) | Produces | Produces | Consumes | Consumes |
| DD (Device Driver) | Produces | — | Consumes | Consumes |
| PDSM (Platform Diagnostic Service Module) | Produces | — | Consumes | Consumes |

It should be noted that the contents of Table 1 primarily serve to provide a summary of the protocols presented thus far in this document, and that Table 1's contents are not meant to be all-inclusive. Should additional protocols be required, support for the additional protocols could be added within the framework according to the teachings set forth herein. As an example, the diagnostic executive secondary protocol (DESP), which logically bridges between operating environments (i.e., between SP and platform or SP and SP), is not included in Table 1. Therefore, the contents of Table 1 should not be construed as limiting the scope of the present invention.

One of the implementations of the invention is as sets of computer readable instructions resident in the random access memory of one or more processing systems configured generally as described in FIGS. 1–10. Until required by the processing system, the set of instructions may be stored in another computer readable memory, for example, in a hard disk drive or in a removable memory such as an optical disk for eventual use in a compact disc (CD) drive or digital video disc (DVD) drive or a floppy disk for eventual use in a floppy disk drive. Further, the set of instructions can be stored in the memory of another processing system and transmitted over a local area network or a wide area network, such as the Internet, where the transmitted signal could be a signal propagated through a medium such as an ISDN line, or the signal may be propagated through an air medium and received by a local satellite to be transferred to the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information.

The method and apparatus herein provides for a flexible implementation. Although the invention has been described using certain specific examples, it will be apparent to those skilled in the art that the invention is not limited to these few examples. For example, the disclosure is discussed herein primarily with regard to the application of Linux to diagnostic architecture utilizing SMP and/or ccNUMA technology, however, the invention can be used in other environments, systems or processes that require full diagnostic support, such as enterprise-class servers or clustered computing systems. Additionally, various operating systems and hardware devices are currently available which could be suitable for use in employing the method as taught herein, e.g., Windows .Net server, Windows 64-bit (when available), as well as Linux 32- and 64-bit, and the like. Generally, the various functions and systems represented by block diagrams are readily implemented by one of ordinary skill in the art using one or more of the implementation techniques listed herein. Note also, that although an embodiment of the present invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A system including a plurality of servers coupled together via expandable interfaces, said plurality of servers comprising:
a plurality of platforms associated with particular servers, said plurality of platforms coupled in 4 way configurations via point-to-pint communication links, and including access ports;
service processors associated with particular servers, said service processors coupled to said plurality of platforms via said access ports; and
at least one program of instructions including instructions to permit said service processors and said plurality of platforms to form a unitary diagnostic framework;
wherein a first service processor associated with a particular server is coupled to particular platforms of said plurality of platforms via said access ports; and
wherein a second service processor associated with a different server communicates with said first service processor within said unitary diagnostic framework.

2. A system comprising:
a first platform;
a second platform;
a first service processor capable of communicating with said first platform to diagnose elements associated with said first platform, wherein said first service processor diagnoses said elements using:
a first set of diagnostic modules to be executed by said first platform; and
a second set of diagnostic modules to be executed by said first service processor; and
a second service processor, wherein said first second service processor is capable of diagnosing elements associated with said second first platform using said second first service processor.

3. A system comprising:
a first platform;
a second platform;
a first service processor capable of communicating with said first platform to diagnose elements associated with said first platform, wherein said first service processor diagnoses said elements using:
a first set of diagnostic modules to be executed by said first platform; and
a second set of diagnostic modules to be executed by said first service processor, wherein said first set of diagnostic modules and said second set of diagnostic modules form a unitary diagnostic framework; and
a second service processor, wherein said second service processor is capable of diagnosing elements associated with said first platform using said first service processor.

4. A method comprising the steps of:
establishing a diagnostic framework having modules running on a first service processor and a first platform, the diagnostic framework including:
a first executive module running on the first service processor; and
a second executive module running on the first platform;
providing a diagnostic command to the first executive module;
routing the diagnostic command to the second executive module; and
delivering the diagnostic command to a test module running on the first platform;
wherein the diagnostic framework further includes:
a third executive module running on a second service processor; and
a fourth executive module running on a second platform; and further including the steps of:
providing a diagnostic command to the first executive module;
routing the diagnostic command to the third executive module;
routing the diagnostic command to the fourth executive module; and
delivering the diagnostic command to a test module running on the second platform.

5. A server comprising:
a plurality of processors;
at least one service processor coupled to said plurality of processors;
a scaling device coupled to said plurality of processors and said service processor;
a first set of diagnostic modules to be executed by said service processor; and
a second set of diagnostic modules to be executed by one or more of said plurality of processors;
wherein said first and second set of diagnostic modules form a diagnostic framework across an interface linking said service processor and said plurality of processors; and
wherein said scaling device enables said server to be scaled with one or more additional servers to form up to a 16-way configuration.

* * * * *